Nov. 16, 1965  J. BERTRAND  3,218,142
PROCESS AND APPARATUS FOR DRAWING GLASS
Filed April 27, 1962  3 Sheets-Sheet 1

INVENTOR.
JEAN BERTRAND
BY *Bauer and Seymour*
ATTORNEYS

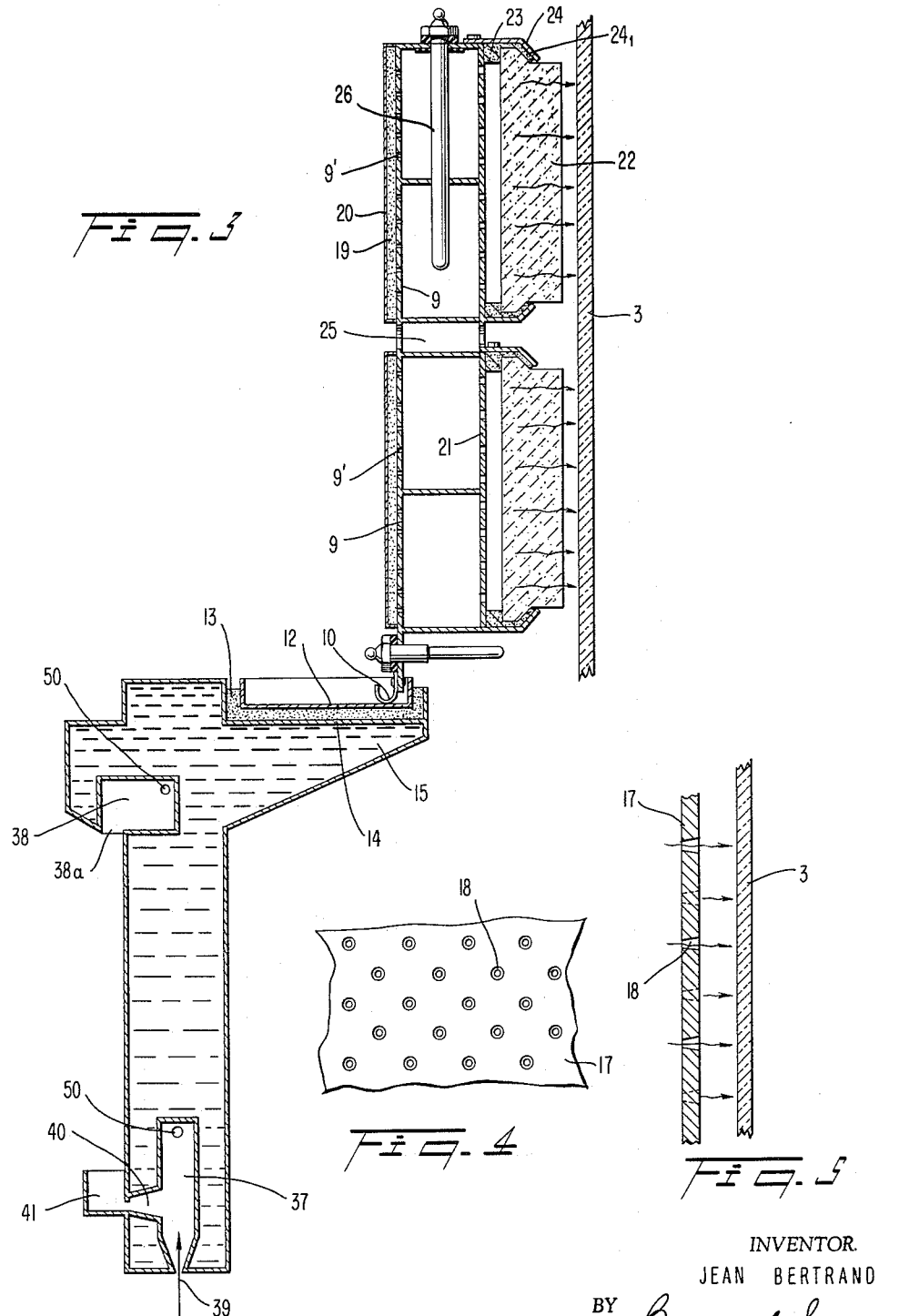

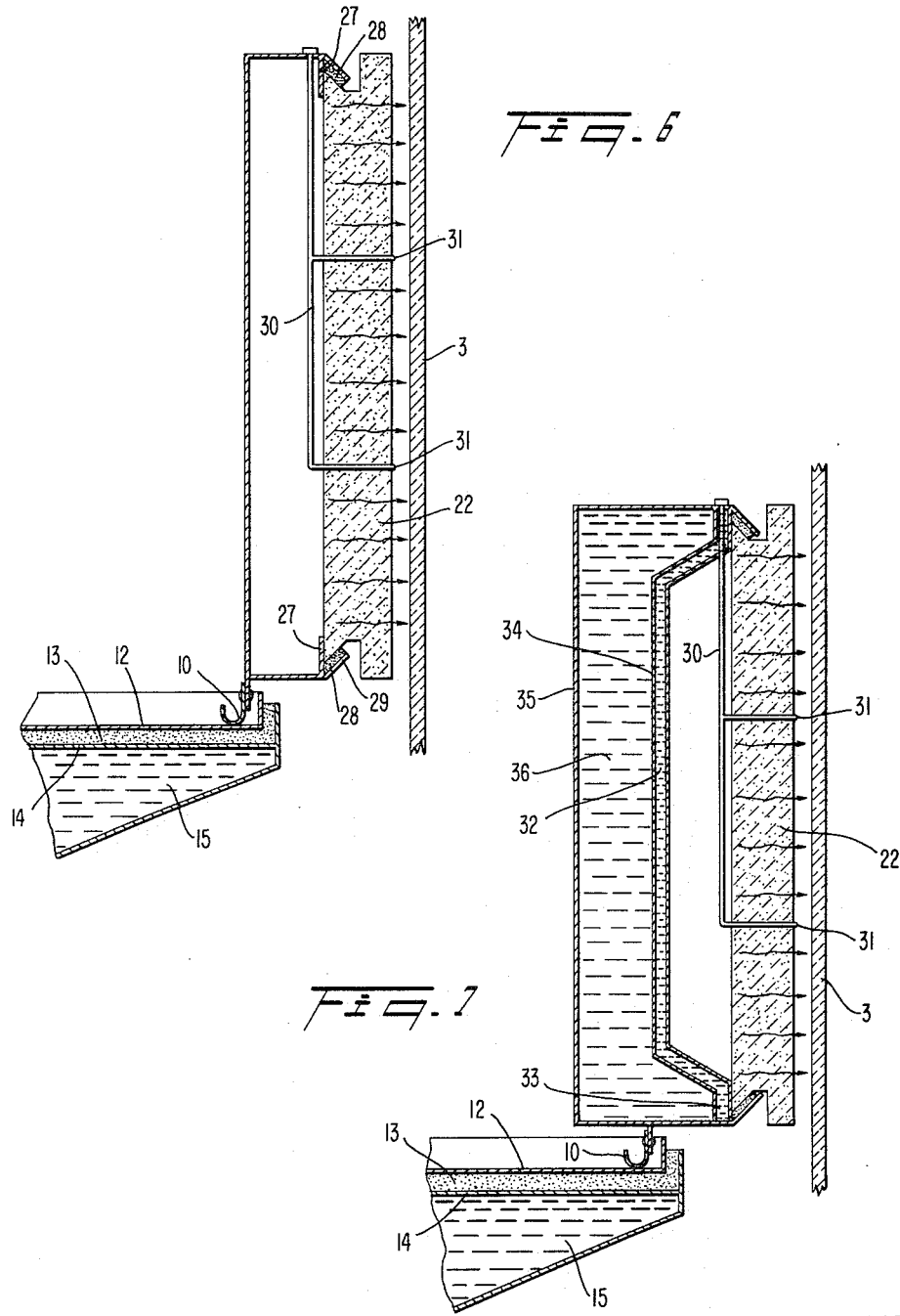

United States Patent Office 3,218,142
Patented Nov. 16, 1965

3,218,142
PROCESS AND APPARATUS FOR
DRAWING GLASS
Jean Bertrand, Milan, Italy, assignor to Compagnie de
Saint-Gobain, Neuilly-sur-Seine, France
Filed Apr. 27, 1962, Ser. No. 190,607
Claims priority, application France, Apr. 27, 1961,
860,135, Patent 1,295,533
8 Claims. (Cl. 65—84)

This invention relates to the drawing of a sheet of glass from a bath of molten glass. In such processes sheet glass is drawn vertically upward from a draw bar block which is either floating or submerged. In these processes the glass passes vertically upward between rollers in a shaft wherein it is cooled at least partially. Two coolers are usually located on opposite sides of the sheet at an appropriate height above the meniscus which forms at the surface of the glass bath below the sheet. Such glass sheets frequently have defects in appearance because of lines parallel to the direction of drawing and which in addition have the grave objection of distorting the shape of objects seen through the glass. It has already been proposed to eliminate these defects but, while some progress has been made, the defects still occur.

It is an object of the invention to eliminate the defects of drawing from vertically drawn sheets.

Another object is to provide an apparatus for drawing sheet glass which has the capacity to produce glass from which the striations and distortions heretofore inherent in drawn glass have been substantially eliminated.

The objects of the invention are accomplished generally speaking by a method of making glass sheet from a bath of molten glass which comprises drawing the entire sheet upward from the bath into an insufflating flow of evenly heated, contiguous hot gas, cooling the sheet by radiation outward through the hot gas, cooler gas being excluded by the hot gas from the part of the sheet which is being cooled by radiation.

The objects are also accomplished by an apparatus for the manufacture of glass sheet comprising a tank for molten glass and a drawing shaft extending upward therefrom equipped with drawing means, a drawing cell within the shaft having cold lower walls and relatively hot walls thereabove, and means to force hot air through the hot walls toward the glass and downward over the glass sheet to and across the surface of the glass in the tank.

In the novel process the glass sheet as it is drawn from a bath of molten glass is received into a cell wherein there exists a pressure of hot gases which is above that of the atmosphere of the drawing shaft, this pressure being provided by introducing the gas into the upper part of the cell where it is uniformly delivered without preferential impacts on the glass sheet toward an area of the sheet extending throughout its full width. The sheet thus moves between two cushions of hot gas which thus establishes a substantially uniform temperature throughout the mass of the sheet, and which results in eliminating the characteristic distortions. It is my view that the distortions which have heretofore been characteristic of drawn sheets arise from the unequal effect and the differences in temperature created in the sheet by its passage between the coolers.

The hot gas under pressure, usually hot air, is blown toward the opposite surfaces of the drawn sheet, by diffusion so as to avoid any inequalities of pressure on the surfaces of the glass, at such a rate that it escapes parallel to the sheet in all directions, and particularly toward the root of the sheet, thus suffusing the sheet and the meniscus with a flow of hot gas, excluding air shaft effects and cooler air currents from the drawing cell, eliminating irregular convection which generates the deformations and contributing to the maintenance of an advantageous drawing viscosity in the glass bath in and adjacent to the meniscus, and escaping by passages provided at the bottom of the drawing cell. These passages may involve gaps between the surface of the glass bath and the coolers, and passages of evacuation built into the coolers themselves, which can be made to contribute to the proper downward flow of the hot gases.

The invention, as to apparatus, involves the construction of a drawing cell which has walls on opposite sides of the sheet comprised of coolers of circulating water type adjacent the surface of the glass bath, extending throughout the width of the sheet, and spaced well apart from the sheet, above which are located blowing chambers or boxes which extend throughout the width of the sheet and which have diffusion faces arranged in close proximity to the surface of the sheet, through which hot gases are blown against the sheet to establish the currents of gas within the cell which have been hereinabove described. These chambers are supplied with hot gas at a temperature which, when it reaches the meniscus after having travelled down in contact with the sheet, will be at a temperature which contributes to the maintenance of the chosen drawing viscosity. The blowing chambers are provided with flat walls facing the glass sheet and provided with perforations or with porosities which eliminate jet effect and deliver the hot gas with substantially uniform effect on the whole insufflated area of the sheet.

The apparatus is advantageously provided with aspiration means which tend to draw the hot gases down along the sheet over the meniscus, and out of the drawing cell. Additional aspirators can be provided on the outer side of the coolers to reduce the flow of cold air toward the surface of the glass bath. There is thus provided a system of drawing glass in which the drawing cell is occupied only by gas at a rigorously controlled temperature, the surfaces of the glass in the cell are suffused with downwardly flowing currents of uniformly heated air, and the cooling of the glass is substantially wholly by radiation, wandering convection currents within the cell being substantially eliminated.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical sectional view through the drawing section of a machine using a submerged draw bar equipped with my invention;

FIG. 3 is a vertical sectional view through half of a specific form of a drawing cell;

FIG. 4 is a face view of a part of the gas delivering face of a blowing box;

FIG. 5 is a cross section of FIG. 4;

FIG. 6 is a vertical sectional detail of a blowing box with some modifications of construction;

FIG. 7 is a further modification of a blowing box, in vertical section.

Figure 1:
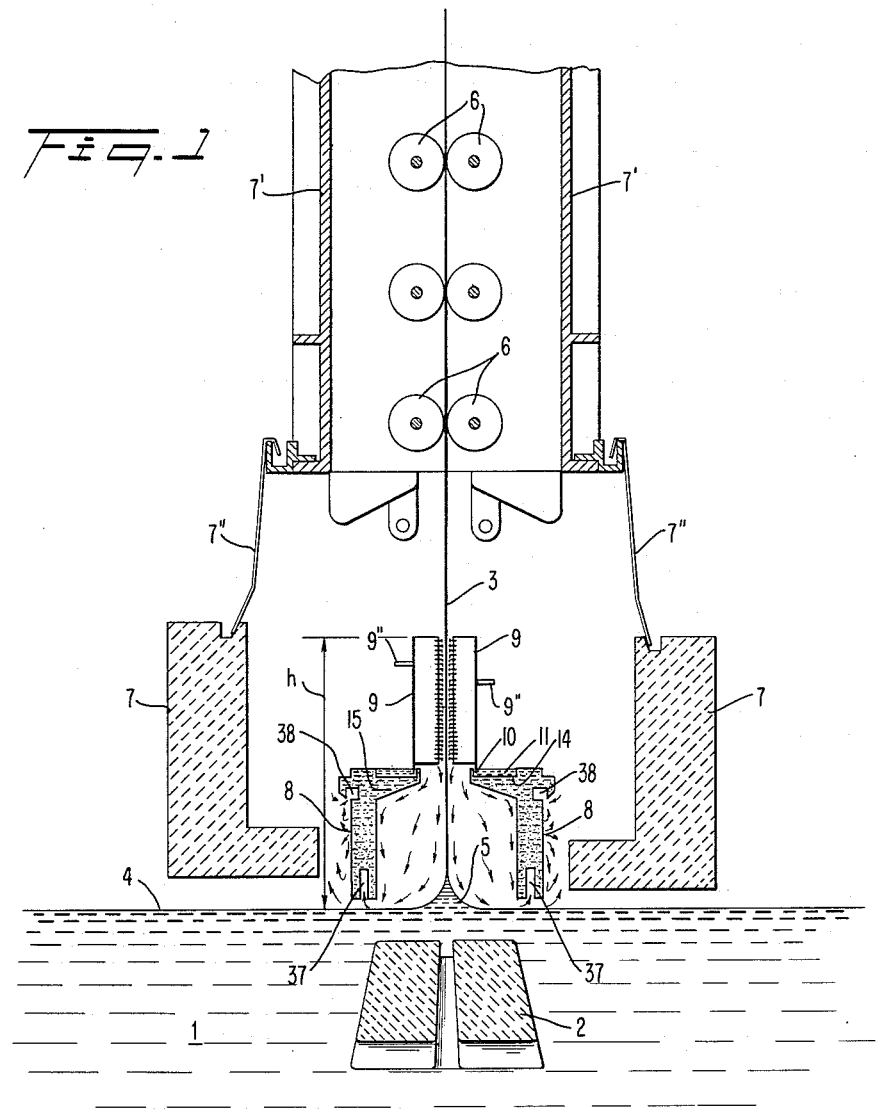

Referring to FIG. 1 the glass bath 1 contains the submerged draw bar 2. The sheet of drawn glass 3 is drawn above the surface 4 of the molten glass, to which it is connected by the meniscus 5, being carried upward by the rollers 6. The draw shaft is composed of refractory blocks 7 of L shape, suspended above the surface of the glass on opposite sides of the drawing plane, the upper portion 7' of the shaft, which supports the rollers 6, and a tight connection 7'' which closes the gaps between the tops of the refractory 7 and the bottom of section 7'. The entire construction 7, 7'', 7' constitutes the drawing shaft.

According to the invention there is formed within the shaft, as above described, a drawing cell which extends from a position very close to the surface of the molten glass to a height $h$ which is at an elevation such that the glass has not yet hardened throughout its thickness. This cell, in the form in which it is disclosed, is comprised of a pair of coolers 8, through which water flows, and which are of inverted L-shape, and which are surmounted by a pair of blowing chambers or boxes 9 which can be moved down and away from the plane of the glass sheet at will. Means for accomplishing such movement is known and is not shown. A tight joint is provided between the tops of the coolers and the bottoms of the blowing chambers. The ends of the cell can be extended beyond the ends of the sheet and joined so as to provide a cell with closed ends, or the ends may be partially or wholly opened as the plant engineer may decide.

Figure 2:
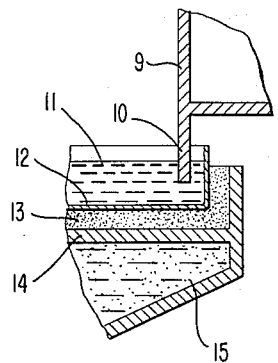
FIG. 2 is a detail in enlarged section of a tight joint in the cell.

In FIG. 2 is shown one construction of the type joint which is formed between the walls of the blowing chambers and the tops of the coolers. The outer wall 9 of the blowing chamber is extended downwardly into a trough 12, and dips into a bath of tin 11 liquid at the temperature of the drawing shaft. The trough may be mounted in asbestos or other refractory and insulating material 13 in a receptacle 14 which is provided in the top of the cooler 8.

In FIG. 3 there is shown a form of tight joint which does not require immersion in a liquid bath, the curved spring band 16 being attached to the lower end of the outer wall of the blowing chamber 9 and placed against the bottom of the trough 12. Both forms of the invention give adequate protection against the inflow of air from the side of the cell.

Since the cell communicates with the exterior between the bottoms of the coolers and the surface of the glass bath, the blowing boxes 9 cannot be in contact with the sheet of glass, and the cell is not tight in the regions of the edges of the glass sheet. It is therefore necessary, in order to produce within the cell a pressure which is constantly superior to that which exists in the drawing shaft, to insufflate the cell through the blowing chambers with a constant flow of air at a pressure superior to that which exists in the shaft. It is also advisable, in order to prevent the glass from being irregularly chilled, that the insufflating air should be heated to a temperature such that, as it flows down the rising sheet of glass and over the surface of the meniscus, it contributes to the maintenance of perfect drawing viscosity.

The air for example under a pressure of about 100–400 m./m. $H_2O$ at a temperature from about 550° to 650° C. is forced in chambers 9 through 9' (FIG. 1) and makes its way through perforations 18 in the faces of the chambers (FIG. 4). These ports 18 are mounted in perforated plates 17 and are arranged in laterally offset rows, the individual ports of which are of conical shape which, the bases of the cones being outward, disperse the gas evenly over the faces of the sheet of glass (FIG. 3). The holes are arranged preferably so that a slight overlap of the discharged jets occurs at or before the jets contact the glass.

The plates 17 are conveniently made of metal and the pressure in the boxes, the number of holes per units of area, and the gas flow are regulated to eliminate concentrated points of impact of the gas on the sheet.

In the form of the invention shown in FIG. 3, the metallic chamber is provided at its outside face with a sheet of asbestos 19 protected by a thin stainless steel plate 20. The metal wall 21 which faces the sheet is pierced with rows of holes which are laterally offset with respect to each other. Outside these sheets there are mounted porous blocks 22 at a distance from the plate 21 which provides an air space between them. These porous plates 22 may be composed of refractory, agglomerated ceramic. These plates are applied from one side to abutments 23 which are mounted on the chambers and are retained by fingers 24 of stainless steel, a layer of asbestos 24' being interposed. A central hole 25 passing through the chamber from one side to the other permits the removal of part of the insufflated air through the central portion of the chamber. Thermocouples 26 extend into the chamber, permitting the close temperature control of the air which is blown against the face of the glass.

FIG. 6 the blowing chamber is of simpler construction having porous refractory ceramic plates 22 attached to a flange 27 which circumscribes the open face of the chamber. Asbestos cords 28 form a tight joint between grooves in the edge of the ceramic and flange 29 on the chamber. Thermocouples 30 having heads 31 exposed on the face adjacent the glass provide for the accurate control of temperature.

FIG. 7 shows another construction of a blowing chamber. Said chamber is in form of a trough 32 with a flat edge 33. Inside the trough is an asbestos coating 34. Said trough is placed in an iron plate tank 35 containing circulating water 36. The construction is otherwise like that of FIG. 6 with porous refractory plates 22 closing the opening of the trough and with the thermocouples 30 having heads 31.

The coolers 8 employed in the invention include tanks through which water flows. Also as one may see in FIGS. 1 and 3, the exterior of the coolers is provided with two evacuation channels 37, 38 which are connected through ports 50 to aspirators located outside the shaft and which serve to aid in the control of the atmosphere inside the cell and outside it. The channel 37 is formed in the lower faces of the coolers, just above the surface of the molten glass and by their intake they aid in the production of a flow of air downward from the blowing boxes through the lower part of the cell in the direction shown by the arrows in FIG. 1. Some of the air passes beyond the lower faces of the coolers and, ascending as shown by the arrows engages and throws back descending currents of cooler air which form on the outer surface of the cooler as indicated by the descending arrows.

Any entrance of cold air in contact with the sheet is thus prevented so as to avoid the production of surface defects such as striations and distortions.

The conduits 38, similarly aspirated through ports 50 entrain the cooler currents of air forming on the upper portions of the outer faces of the coolers and prevent the establishing of strong descending currents. By the regulation of the inflow of hot air by the box 9 and the intensity of the vacuum established through the channels 37, 38 one may exercise control of the currents inside and outside the coolers, making any entry of cold air beneath the bottoms of the coolers impossible. Even the air which is cooled on the inner faces of the coolers tends to flow as indicated by the arrows and to mingle with the hotter air which flows down the ascending sheet. The currents of hotter and cooler air, from the sheet and the coolers, respectively, join at the gap beneath the coolers and are impelled outwardly aided by the vacuum in channels 37. It is to be understood that these channels extend the full length of the coolers. As any cold air descends to the surface of the glass outside the coolers it is trapped by the vacuum in channels 37 before it can penetrate into the cell.

In FIG. 3 the channel 37 has a reduced bottom orifice 39, compared to FIG. 1, and it is provided with a scoop 41 extending the length of the cooler which captures any cold currents descending along the side of the cooler and permits their ready withdrawal through aspirated port 50. This trough also has the function of capturing any sulfate dust which is formed in the vicinity of the cooled wall and which, in descending, have heretofore contaminated the glass bath.

As many apparently widely differing embodiments of the present invention may be made without departing from the spirit and scope thereof, it is to be understood that the invention is not limited to the specific embodiments.

What is claimed is:

1. A method of making glass sheet from a bath of molten glass which comprises drawing the entire sheet upward from the bath, forcing an evenly heated mass of hot gas toward a surface of the sheet and suffusing the entire width of the surface of the sheet with the hot gas, forcing the mass of hot gas to flow downward in contact with the entire surface of the sheet to the surface of the bath, and cooling the sheet by radiation through the flow of hot gas.

2. A method of making glass sheet from a bath of molten glass which comprises drawing the entire sheet upward from the bath, forcing an evenly heated mass of hot gas toward each of the opposite surfaces of the sheet and suffusing the entire widths of said surfaces with the hot gas, forcing the mass of hot gas to flow downward in contact with the entire surfaces of the sheet to the surface of the bath, and cooling the sheet by radiation through the flow of hot gas.

3. A method according to claim 2, in which the flow of evenly heated gas is at a temperature, when in contact with the surface of the glass bath, which contributes to the maintenance of uniform drawing viscosity.

4. Apparatus for the manufacture of glass sheet, comprising a tank for molten glass, a drawing shaft extending from the tank, glass sheet drawing means mounted in the shaft, including means to grip the sheet and draw it from the meniscus which forms at the surface of the glass in the tank, coolers within the shaft on opposite sides of the meniscus having upper surfaces adjacent the drawn sheet and lower surfaces near the level of the glass and more remote from the sheet, blowing means above and joined to the coolers including opposed chambers having diffusing means close to the plane of the drawn sheet and extending throughout the width of the glass sheet, the blowers, the coolers, and the surface of the glass forming a drawing cell with lower cold lateral walls close to the sheet, means to force hot gas into the blowing means through the diffusion means against the drawn sheet, and means to draw the hot gas down from the diffusion means past said surfaces of the coolers to the surface of the glass in the tank.

5. Apparatus according to claim 4 in which said means to draw the hot gas down from the diffusion means includes orifices at the lower surfaces of the coolers, evacuation channels from the orifices to the outside of the drawing shaft, and means to draw gases from said drawing cell into the orifices and through the evacuation channels.

6. Apparatus according to claim 4 wherein the distance between the opposite blowing means can be regulated.

7. Apparatus for the manufacture of glass sheet, comprising a tank for molten glass, a drawing shaft extending from the tank, glass sheet drawing means mounted in the shaft, including means to grip the sheet and draw it from the meniscus which forms at the surface of the glass in the tank, coolers of inverted L shape within the shaft on opposite sides of the meniscus having upper surfaces adjacent the drawn sheet and lower surfaces near the level of the glass and more remote from the sheet, channels in the coolers opening into the drawing shaft adjacent the glass level, external channels in the coolers at a higher level, means to draw off gases from the shaft through the said channels, blowing means above and joined to the coolers including opposed chambers having diffusing means close to the plane of the drawn glass sheet and extending throughout the width of the glass sheet, the blowers, the coolers, and the surface of the glass forming a drawing cell with lower cold lateral walls close to the sheet, and means to force hot gas into the blowing means through the diffusion means against the drawn sheet, whereby a flow of hot gas downward over the surfaces of the glass and the meniscus toward the channels may be maintained.

8. Apparatus according to claim 7 wherein each blowing chamber is tightly united to the cooler situated on the same side with respect to the glass sheet.

References Cited by the Examiner

UNITED STATES PATENTS

| 1,598,730 | 9/1926 | Koupal | 65—83 |
| 2,158,669 | 5/1939 | Amsler | 65—84 |
| 2,608,798 | 9/1952 | Sharp | 65—84 |
| 2,655,765 | 10/1953 | Walters | 65—84 |
| 2,691,247 | 10/1954 | Henry et al. | 65—85 |
| 2,693,052 | 11/1954 | Brichard | 65—84 |

FOREIGN PATENTS 724,326 2/1955 Great Britain.

DONALL H. SYLVESTER, *Primary Examiner.*